United States Patent [19]

Lee et al.

[11] Patent Number: 4,640,901
[45] Date of Patent: Feb. 3, 1987

[54] HIGH TEMPERATURE MEMBRANE

[75] Inventors: Kew-Ho Lee; Soon-Jai Khang, both of Cincinnati, Ohio

[73] Assignee: University of Cincinnati, Cincinnati, Ohio

[21] Appl. No.: 712,862

[22] Filed: Mar. 18, 1985

[51] Int. Cl.⁴ .............................................. C04B 38/06
[52] U.S. Cl. ........................................ 501/81; 501/80; 423/335; 55/158; 427/245; 427/387; 427/397.7
[58] Field of Search ............ 427/245, 344, 387, 397.7; 423/335; 501/80, 81; 55/16, 158

[56] References Cited

U.S. PATENT DOCUMENTS 3,754,375  8/1973  Bouchilloux et al. .................. 55/16
4,535,026  8/1985  Yoldas et al. ..................... 427/397.7

FOREIGN PATENT DOCUMENTS 56-17917  2/1981  Japan ................................... 423/335
59-10306  1/1984  Japan .................................... 55/158

Primary Examiner—William R. Dixon, Jr.
Assistant Examiner—Steven Capella
Attorney, Agent, or Firm—Frost & Jacobs

[57] ABSTRACT

The present invention concerns a method of making a silica-based membrane comprising the steps of:

(1) pyrolyzing the material made of one of the class comprising polysilicone rubber, polysilane and polysiloxane at a temperature range of about 500° C. to about 1000° C. for about 2 hours (minimum) in an inert atmosphere; and (2) oxidizing the pyrolyzed material at a sufficient temperature range of about 300° C. to about 1000° C. to crosslink the material with oxygen. The membrane typically has a B.E.T. surface-area measurement of about 220 m²/g which indicates a highly porous membrane—about 40 to 70% porosity.

The present invention may also be characterized by producing a pyrolyzed membrane by the method described above, and coating the membrane with silicon material to fill in the large micropores, and repyrolyzing the coated membrane to produce a membrane having extremely small micropores to assure that such gases as hydrogen and helium can be separated by the membrane product of the present invention to a high level of selectivity.

16 Claims, 1 Drawing Figure

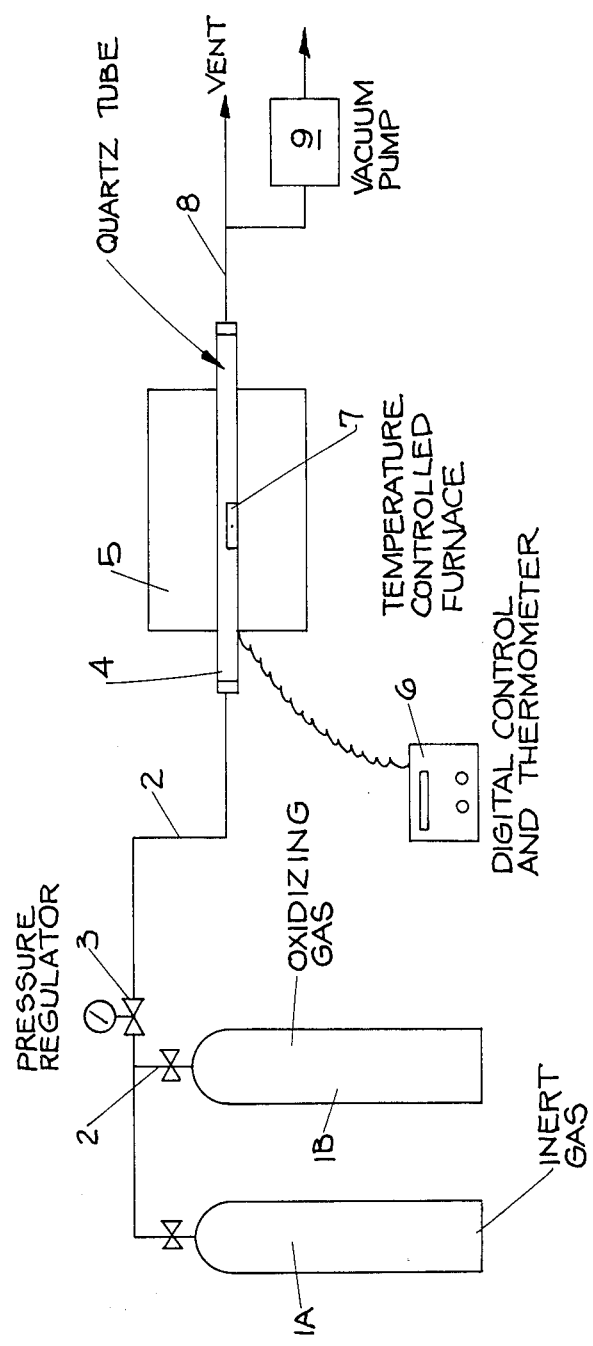

HIGH TEMPERATURE MEMBRANE

BACKGROUND OF THE INVENTION
1. Field of the Invention

The present invention relates to membranes employed, for example, in the separation of gases. In particular, the present invention relates to thermally stable membranes capable of withstanding high temperatures so as to be useful in the separation of hot industrial gases.

2. Prior Art

The use of membranes to separate gases from liquids, gases from other gases, and gases from solids is well known in the art. Typically, these membranes comprise a polymeric material such as polyethylene, polypropylene, polyvinylchloride, polytetrafluoroethylene, polyacrylonitrile, and in general polyesters and polyolefins, to name a few. In general, polymeric membranes are formed by preparing a solution of the polymer material, including any carrier solvents, hardeners, softeners, fillers, or the like; spreading the solution into a thin film by any well-known technique such as spraying, substrate dipping, or pouring a thin coating; and permitting the thin film to dry by means of ambient or heated air, for example. Polymeric membranes are employed for the purposes set forth above at ambient or room temperatures of about 25° C. Occasionally, polymeric membranes are employed up to temperatures of about 100° C. Most polymeric membranes decompose above 150° C., thus the useful temperature range of polymeric membranes is relatively narrow.

U.S. Pat. 4,428,776 issued to Li is exemplary of polymeric membranes. The Li patent discloses a cellulosic semi-permeable membrane containing silicon compounds. The membrane is useful for the separation of various gaseous mixtures into their constituent parts, such as separating raw natural gas into enriched fractions of carbon dioxide and methane. The semi-permeable membrane is prepared from at least one cellulosic polymer and at least one silicon compound such as substituted silanes or siloxanes. In one embodiment, the unmodified cellulosic polymers are dissolved in a suitable solvent to form about 2 to about 20 weight percent solution. The resulting mixture is then poured over a clean glass plate and spread evenly to a uniform thickness with the aid of some instrument, typically a doctor's blade. The membrane is then air dryed, removed from the glass plate and further dried in air under ambient conditions for a suitable period of time, generally in excess of 24 hours. Additionally, the membranes are manufactured in structures other than films, such as hollow fibers, for example. Although the membranes are fabricated at any desirable thickness, membranes having a thickness less than about 25 mils tend to be most useful for the purposes described previously. These membranes are employed in the same manner as known membranes, i.e., a gaseous mixture to be separated is contacted with one side of the membrane in such a manner that one or more constituent parts of the gaseous mixture selectively pass through the membrane while the remaining constituent parts are rejected or prevented from passing through the membrane.

Recently, a molecular sieve carbon membrane, that contains no pores greater than those of molecular dimensions, was produced by pyrolysis of carbon containing compounds. The molecular sieve carbon membrane displayed gas permeabilities and selectivities that was considerably greater than most of the presently known polymer membranes. The pyrolysis was conducted at a temperature of 800° C. to 950° C. in the presence of substantially inert gas. Some oxidizing gas was employed in order to widen, by gradual burnoff, the pore size to achieve a specific permeability and selectivity. Pyrolysis of the membrane achieved ultramicroporosity, and it is theorized that the porosity was a result of small gaseous molecules channeling their way out of the solid matrix of the membrane during the pyrolysis. Thus the micro-pore structure was widened by oxidation burnoff to cause channeling of small gaseous molecules, or closed by high temperature centering which served to shrink the membrane. Molecular sieve carbon membranes were disclosed in the *Journal Of Separation Science And Technology* in 1983 by Dr. Abraham Sofer and Jacob E. Koresh.

The molecular sieve carbon membranes were employed to separate such gases as helium, oxygen, nitrogen, sulfur hexafluoride, and, to a lesser extent, carbon dioxide. However, these membranes, like the polymeric membranes, cannot withstand high temperature oxidizing gases and thus cannot be employed in the separation of hot industrial oxidizing gases because the molecular sieve carbon membranes disintegrate, particularly in an oxygen atmosphere, at temperatures above about 250° C. to 300° C.

Conventionally, high temperature separation of oxidizing gases from liquids or solids had been accomplished with porous ceramic, sintered metal or boronated glass in which the boron has been leached therefrom in order to produce a porous structure. While these materials were useful in separating gases from liquids and gases from solids, their use in separating gases from other gases was not well received due to the fact that the porosity of the above separation materials was overly large to the extent that very few gases would be retained by the separation materials. Moreover, when the separation materials were employed to separate gases from other gases, obtaining a uniform pore size in, for example, the leached boronated glass, was difficult and unsuccessful to the degree necessary to obtain adequate separation.

In summary, separation of hot industrial gases from liquids or solids could be accomplished by porous ceramic, for example. However, the materials capable of withstanding high temperature were not capable of separating gases from other gases. Polymeric membranes could be employed for separating gases from other gases, but these membranes were incapable of withstanding high temperatures.

SUMMARY OF THE INVENTION

The present invention provides a membrane, and a method for production thereof, capable of withstanding high temperatures, containing pores having molecular dimensions so as to achieve gas permeabilities and selectivities that are considerably greater than known polymeric type membranes and most separation materials such as porous ceramic. Because the membranes of the present invention are capable of withstanding higher temperatures, they enjoy the ability to separate hot industrial gases and particularly hot industrial oxidizing gases. Prior to the present invention, hot industrial oxidizing gases had to be cooled before being separated by polymeric membranes.

The present invention forms a silica-based membrane from silicon-base polymer materials such as polysilicone rubber, polysilanes or polysiloxanes. The silica-based membrane is formed by pyrolyzing the silicon polymer material in an inert gas at, for example, 800° C. until the hydrocarbon elements are driven off. It is theorized that the material remaining after pyrolysis is essentially partially crosslinked—SiO chains, and is brittle and porous in nature. The remaining pyrolyzed material is porous because substantially all the hydrocarbons in the silicon base polymer material have been driven off.

The remaining pyrolyzed material is then subjected to an oxygen environment for a period of time sufficient to crosslink the—SiO chains with oxygen to form a refractory material comprising essentially silica ($SiO_2$). Although it is not necessary to introduce oxygen within a specific pressure range and a specific temperature range, the oxygen should be amply warm or hot to avoid any thermal shock when the oxygen contacts the remaining pyrolyzed material, and the pressure should be sufficient to liberally supply the material with oxygen to assure good crosslinking.

Because silica is a refractory type material, it is capable of withstanding high temperatures up to about 1090° C., at which point it melts. Most industrial gases range in temperature from 200°–500° C. Accordingly, the silica-based membrane of the present invention can easily withstand high temperatures during separation of hot industrial gases.

The broadest sense of the present invention concerns a method for making a silica-based membrane and a product produced by the method, the method comprising the steps of: (1) pyrolyzing a material made of one of the class comprising polysilicone rubber, polysilanes and polysiloxanes at a temperature range of about 500° C. to 1000° C., for about two hours, in a positive pressure inert gas atmosphere; and (2) oxidizing the pyrolyzed material at a sufficient temperature range of about 300° C. to about 600° C. and at a pressure range of about 2 to 5 psig to crosslink the material with oxygen, to produce a membrane consisting essentially of silica. The membrane typically has a B.E.T. surface-area measurement of about 220 $m^2/g$ which indicates a highly porous membrane—about 40 to 70 percent porosity.

Optionally, the method for making a silica-based membrane may include the additional step of re-pyrolyzing the material at a temperature of up to about 1000° C., for about 2 hours, or longer, to assure that all hydrocarbons are driven off or otherwise removed.

The present invention may also be characterized by producing a pyrolyzed membrane by the method previously stated, followed by the steps of coating the membrane with silicon material to fill in the larger micropores, and then re-pyrolyze the coated membrane to produce a membrane having extremely small micropores to assure that gases such as hydrogen and helium, which have very small molecules, can be separated to a high level of selectivity.

Further advantageous features of the present invention will become apparent from the drawing and the description and claims set forth below.

BRIEF DESCRIPTION OF THE DRAWING

The FIGURE of the drawing is a schematic view of the equipment employed to conduct the method of the present invention.

DESCRIPTION OF THE PREFERRED EMBODIMENTS

A silicon-based material is employed in the present invention to make a silica-base membrane by pyrolyzing the silicon-based material in an inert gas atmosphere at a temperature sufficiently high to drive off substantially all hydrocarbons in the silicon-based material, subjecting the pyrolyzed material to oxygenating atmosphere to crosslink the material, and optionally, submitting the crosslinked material to re-pyrolysis. Although this procedure produces a membrane having microporous cracks, the size of the cracks can be controlled by temperature and time controls, and/or by coating the pyrolyzed silica membrane with silicon material, or other thermo-setting materials so as to fill the larger cracks, and then re-pyrolyze the membrane in an inert atmosphere, so that only very small micropore cracks remain in the membrane.

Silicon material which forms a porous silica membrane upon pyrolysis is desirable because silica is a refractory capable of withstanding the high temperatures of hot industrial gases. For example, silica generally melts at 1090° C., which is substantially higher than the temperature of most industrial gases. Moreover, silica is fairly inert and does not react with most gases, solids and liquids such that it is capable of separating gases from liquids, gases from solids, or gases from other gases at high temperatures. Separating hot industrial gases into their components will likely be the most common use for the present invention. However, the uses of membranes is well known to those skilled in the art and the present invention is not limited to any one specific use.

The silicon-based materials which are capable of producing a silica membrane upon pyrolysis can include any one of polysilicone rubber having the general formula $(R_2SiO)_n$ where R represents hydrogen, hydroxides or hydrocarbon compounds, and n represents a large number of the silicon rubber units; polysilanes having the formula $(SiR_4)_n$, where R represents hydrogen, hydroxides or hydrocarbon compounds, at least one of which contains oxygen, and n represents a large number of the silane units; or polysiloxanes having the formula $(R_3SiOH)_n$, where R represents hydrogen, hydroxides or hydrocarbon compounds, and n represents a large number of siloxane units. In general, any material having silicon-oxygen bonds may suffice, particularly when the remaining material comprises hydrocarbons that can easily be driven off by pyrolysis, thus leaving the chain—SiO.

Although any form of the material could be employed for making the membrane, such as thin sheet material for making a membrane film, the preferred form of the present invention is small hollow tubes. In general, tubular shapes are mechanically stronger than thin sheet shapes and have a large surface contact area per volume of space occupied by the membrane. The tubular form is capable of withstanding gas pressures typically found in industrial processes in which the membrane of the present invention might be utilized. The mechanical strength of the material after pyrolysis is particularly important since such materials as polysilicone rubber lose approximately one-half, or more, of their weight during pyrolysis. The tubular shape is the strongest shape considered for membrane application.

The pyrolysis temperature is, in general, greater than about 500° C. because it must be sufficient to drive off most of the hydrocarbon material of the various silicon-based materials. Of course, a temperature less than 500° C. may be employed, for a specific hydrocarbon which can easily be driven off. However, if a temperature less than 500° C. is employed for all hydrocarbons, some hydrocarbons may remain in polysilicon rubber, for example, such that the resulting pyrolyzed membrane is still flexible and elastic.

The porosity of the membrane must be sufficient to permit the separation of gases. Failure to remove substantially all of the hydrocarbons results in low or no porosity in the membrane. The upper limit of pyrolysis temperature would be that temperature at which silica melts, i.e., 1090° C. Melting the silica into glass would not produce a porous membrane. Preferably, the temperature of pyrolysis would not exceed 1000° C. since temperature in excess of this is not economically feasible, results in extreme cracking, and results in excessive shrinkage. It is theorized that shrinkage occurs when the product partially collapses upon itself, resulting in a less porous product even though there is extreme cracking. This is because the cracking does not increase the porosity but is merely a result of pore openings agglomerating together to form large cracks.

Although the minimum time of pyrolysis is about two hours, any time period of sufficient duration to drive off the hydrocarbon material would be satisfactory. Present experience has shown that about two hours is the minimum time and preferably at least four hours of pyrolysis is employed in the method of the present invention. Although there is no upper limit for pyrolysis duration, economy of time and expense of heating dictate a reasonable time duration.

Inert gases that can be employed in the present invention are helium, nitrogen, neon, argon, or the like. In general, any gas which will not react with the silicon-based material to be pyrolyzed is satisfactory for the present invention. However, the cheap cost of helium or nitrogen as compared to neon or argon, for example, make these gases the preferred inert gases. Additionally, combinations of inert gases such as $CO_2$ and nitrogen may be employed. Preferably, helium gas is employed because it has been observed that the resultant product is much stronger as compared to other resultant products when nitrogen gas is employed, for example. The inert gas is employed at a slight positive pressure (generally 2-5 psig) so that if any of the gas flow lines are leaking, the inert gas will flow outward, thereby preventing the inflow of oxidizing gas.

After the pyrolysis step, the membrane is subjected to an oxidizing gas such as air or oxygen, with air being preferred. The oxidizing gas crosslinks the —SiO chains in the pyrolyzed membrane with oxygen to form the refractory $SiO_2$. The oxidation is conducted at a temperature range of about 300° C. to about 600° C., at a slight positive pressure (generally 2-5 psig) for a duration of at least 2 hours, and preferably 4 hours.

The figure of the drawing schematically illustrates the equipment necessary to manufacture the membrane of the present invention. Reference numeral 1A illustrates a source of inert gas connected to gas line 2. Reference numeral 1B illustrates a source of oxidizing gas also connected to line 2. Both the source of inert gas 1A and the source of oxidizing gas 1B have associated valves to open and close the source with respect to the gas line 2. Gas line 2 also includes a pressure regulator valve 3 which is designed to regulate the gas from either source 1A or 1B. The other end of gas line 2 is connected to a quartz tube 4. The quartz tube 4 has a center portion which is positioned within a high temperature furnace 5, while each end of the quartz tube extends outside of the high temperature furnace. The furnace is controlled by a digital control 6 which not only controls the temperature of the furnace, but also acts as a thermometer to display the interior temperature therein. The silicon-based membrane material 7 is positioned in the center of the quartz tube, which is in the center of the high temperature furnace 5. The exhaust end of the quartz tube is in fluid communication with a gas outlet line 8 which may be vented to the atmosphere. Optionally, a vacuum pump 9 may be fluidly coupled to the gas outlet line 8 so as to produce a vacuum within the quartz tube, if desired. One or both ends of the quartz tube are removable, thus permitting access to the interior thereof in order to place the silicon-based membrane material 7 therein.

Once the furnace has achieved pyrolysis temperature, the source of inert gas is opened so as to permit inert gas to flow into the gas inlet conduit 2, into the quartz tube 4, and exit through gas outlet line 8. The silicon-membrane material is positioned within the quartz tube and hermetically sealed therein. The quartz tube is then positioned within the furnace.

After pyrolysis, the source of inert gas 1A is closed and the membrane is permitted to cool slightly. When the temperature of the furnace is within the operation range for oxidation, the gas valve for the source of oxidizing gas is opened to permit the gas to flow into conduit 2, quartz tube 4, and exit through gas outlet 8.

The method of the present invention consists in pyrolyzing a silicon-based material such as polysilicone rubber, in an inert gas, such as helium, at a temperature sufficiently high to drive off substantially all hydrocarbons in the silicon-based material. Generally, the pyrolysis temperature range is between about 500° C. to about 1000° C. for a duration of about 2 hours or more. The pressure of the inert gas is from 2 to 5 psig, which is sufficient to pressurize the flow passages of the gas so as to prevent ambient air from finding its way into the quartz tube. The pyrolysis step burns or drives off the hydrocarbon material of the silicon-based material leaving a pyrolyzed material which is brittle, weak and porous and consists of losely connected SiO chains and perhaps some hydrocarbons. Depending upon the temperature of pyrolysis, the degree of shrinkage will vary. At about 800° C. the shrinkage is about 10%. After pyrolysis there is a weight decrease of 40 to 70%. The weight loss is because the hydrocarbons are burned or driven off.

The second step consists of oxidizing the pyrolyzed material. The oxidizing gas is introduced into the surrounding atmosphere of the pyrolyzed material so that it crosslinks the loosely connected SiO chains with oxygen to form $SiO_2$ and perhaps some hydrocarbons. The pressure and flow rate of the oxidizing gas is about the same as that for the inert gas because it is desirable to maintain a positive pressure within the quartz tube in order to prevent contaminated ambient air from finding its way to the pyrolyzed material. Crosslinking with oxygen is normally conducted within the temperature range of about 300° C. to about 600° C. If the oxidation step is conducted substantially below 300° C. incomplete crosslinking occurs. If the oxidation step is conducted substantially above 600° C., the resulting product becomes very brittle and sometimes glossy in appearance. Although the minimum time for oxidizing is about 2 hours, any time period of sufficient duration to crosslink the -SiO radicals would be satisfactory. Present experience has shown that about 2 hours is the minimum time and at least 4 hours for oxidizing is preferably employed in the method of the present invention. Although there is no upper limit for oxidizing time, economy of time and expense of heating dictate a reasonable time duration. After oxidation, the weight of the pyrolyzed and oxidized material increases slightly indicating that oxygen has reacted with the SiO chains to form silica ($SiO_2$). Although there is a slight increase in weight, the porosity remains approximately the same, i.e., in a range of 40 to 70 percent. The B.E.T. surface area measurement of a pyrolized, oxidized membrane is about 220 $m^2/g$, which indicates a highly porous membrane.

Optionally, a third step of the process may comprise re-pyrolizing the oxygenated membrane. Re-pyrolysis is generally conducted at a temperature range of about 500° C. to about 1000° C. Preferably, re-pyrolysis takes place at about 950° C. The purpose of this optional step is to assure that all the hydrocarbons are burned or driven off. The re-pyrolysis step is conducted in an inert gas atmosphere at substantially the same pressures and flow rates as the first pyrolyzation step described previously. Temperatures below 500° C. may not be beneficial for re-pyrolization, particularly since the first pyrolyzation step is generally conducted at about 800° C. Since silica melts at 1090° C. the re-pyrolyzation step must be below that temperature. Thus, it is advantageous to conduct the re-pyrolyzation step at about 950 to 1000° C. in order to burn or drive off all hydrocarbon material and yet not melt the silica membrane. The preferred inert gas in the re-pyrolyzing step is helium because it has been observed that the use of helium produces a stronger product as compared to other products when other inert gases are employed. The exact reason why this occurs is not known. Like the first pyrolyzing step, the time duration of the re-pyrolyzation step is at least about 2 hours in order to assure that all the hydrocarbons are burned or driven off. Time durations greater than 2 hours are frequently employed, especially since there is no maximum time duration for the re-pyrolyzation step. Although there is no upper limit on the re-pyrolysis duration, economy of time and expense of heating dictate a reasonable time duration.

An optional step for the present invention calls for coating the membrane of either step 2 or step 3 with silicon material to fill in the larger micropores, and then re-pyrolyze the coated membrane to produce a membrane having extremely small micropores in order to separate very light gases such as hydrogen or helium to a high degree of selectivity. Typically, the membrane may be coated with silicone oil by spraying, dipping, brushing, or the like so that the silicone oil coats the membrane and fills in the micropores thereof. The membrane is then re-pyrolyzed which burns or drives off the hydrocarbons contained in the silicone oil and thus there remains in the pores a losely connected structure of—SiO chains. These chains may be crosslinked by oxygenation as was done previously. However, the micropores are generally small in size compared to the surrounding material such that there is generally sufficient oxygen to convert the SiO chains to silica during the pyrolyzing procedure of the fourth step. In order to assure that the silicone oil binds itself with the silica membrane, it is often desirable to employ a catalyst to produce a more favorable bonding reaction. Typically, such vulcanizing catalysts are zinc, platinum, or organic peroxide, such as 2, 4 benzoic peroxide. Generally, the vulcanizing agent is mixed with the silicone oil and comprises about 1% by weight thereof. In this manner, when the silica membrane is dipped in or otherwise coated by the silicone oil, the vulcanizing agent enclosed therewith assures that the silicone oil, during pyrolysis, is adequately bonded to the remaining silica structure. The purpose for coating the silica material is to control the pore size. For example, if a very, very small pore size is desired, it may be necessary to repeat step 4 multiple times in order to achieve the desired pore size. This clearly suggests that each coating of the silica membrane with the silicone oil fills up the pores progressively until, in theory, the silica membrane becomes solid in form.

The following examples are illustrative of the method of the present invention.

EXAMPLE 1

A silicon rubber tube about 4 inches in length having an outside diameter of 0.025 inches and an inside diameter of 0.012 inches was placed in the quartz tube shown in FIG. 1. The pyrolysis gas employed was air, and the pyrolysis temperature was 400° C. The duration of the pyrolysis was six hours. At the end of six hours, the quartz tube was removed from the furnace and cooled. The pyrolyzed silicon rubber tube was removed from the quartz tube. It had completely solidified, perhaps indicating that the tube had shrunk until it had become non non-porous.

Then the tube was placed back in the quartz tube and heated to a temperature of 470° C. for a duration of 10 hours. At the end of the second pyrolysis step, the product had completely powderized.

EXAMPLE 2

A silicon rubber tube was prepared for pyrolysis and was substantially the same size described in Example 1. The pyrolysis temperature was 200° C., the pyrolysis gas was air, and the duration of pyrolysis was 60 hours. After removal of the sample from the quartz tube, it was noted that some elasticity remained. It appears this was a direct result of incomplete burnoff of the hydrocarbons in the silicon rubber during pyrolysis.

Based upon Examples 1 and 2, it is clear that employing air in the pyrolyzing step does not produce a porous membrane. When the pyrolyzation gas is air and the temperature is about 200° C., not all the hydrocarbons are driven from the silicon rubber, which is evidenced by the fact that some elasticity remains. If the temperature of around 400° C. is used, the silicon rubber tube solidifies as is illustrated in the first part of Example 1. If the temperature is above 400° C., for example, 470° C., it appears that the silicon rubber tube is transformed into powder.

EXAMPLE 3

A silicon rubber tube of the dimensions set forth in Example 1 was prepared for pyrolysis by introducing it into the quartz tube illustrated in FIG. 1. The temperature of pyrolysis was 540° C., the pyrolysis gas was helium and the duration of pyrolysis was four hours. At the end of the pyrolysis step an oxidizing step was conducted by permitting the pyrolyzed membrane to cool to 370° C. (the temperature was maintained at 370° C. throughout the oxidizing step) wherein air was employed as the oxidizing gas for a duration of five hours.

At the end of step 2 (the oxidizing step) a third step was conducted in which the oxidized sample was re-pyrolyzed at 840° C. in an inert gas atmosphere of helium for a duration of 12 hours. Originally the silicon rubber tube weighed 0.0114 grams. After the re-pyrolyzing step (step 3) the silica membrane was weighed and found to be 0.0055 gram, indicating a weight loss of approximately 52%. A B.E.T. surface area measurement was conducted on the silica membrane and found to be 220 m$^2$/g. The resulting silica membrane appeared to be very strong.

EXAMPLE 4

A silicon rubber tube of the dimensions set forth in Example 1 was pyrolyzed at a temperature of 750° C. for three hours in a helium atmosphere. The resulting product was very weak.

EXAMPLES 5 and 6

Two silicon rubber tubes of the dimensions of Example 1 were pyrolyzed in a helium atmosphere for a time duration of 12 hours at a temperature ranging from 230° C. to 800° C. Like the resultant product of Example 4, both the products of these examples were very weak.

EXAMPLES 7 and 8

Two silicon rubber tubes of the dimensions set forth in Example 1 were pyrolyzed in a helium atmosphere at 800° C. for 12 hours. The original weight of Example 7 was 0.0108 gram. After step 1, the weight of Example 7 was 0.0041 gram, indicating a weight loss of 62%. The resultant product was very weak. Examples 4–8 resulted in a product which was very weak and thus lacking sufficient strength to perform as a membrane. These examples also clearly indicate that a weak product results if the oxygenation step is omitted. Note that the oxygenation step of Example 3 resulted in a strong product.

EXAMPLES 9 and 10

Two silicon rubber tubes of the dimensions set forth in Example 1 were pyrolyzed in a helium atmosphere at a temperature of 450° C. to 520° C. for a duration of 4½ hours. After pyrolysis, both examples were subjected to the oxygenation step in which air was introduced into the quartz tube for a duration of 4 hours at a temperature of 450° C. After the oxidizing step, the sample was re-pyrolyzed in a helium atmosphere at 800° C. for a duration of 12½ hours. Example 10 originally weighed 0.0109 gram. After step 3 (the re-pyrolyzation step) the sample weighed 0.0044 gram indicating a weight loss of approximately 60%. Again both products proved to be strong.

EXAMPLES 11 and 12

Two silicon rubber tubes of the dimensions set forth in Example 1 were pyrolyzed in an air atmosphere at 430° C. for a duration of 3½ hours. At the end of the pyrolyzation step the products of each example were powderized. These examples confirm the results of Example 1.

EXAMPLE 13

A silicon rubber tube of the dimensions set forth in Example 1 was oxidized in an atmosphere of air at 200° C. to 350° C. for 1 hour. At the end of the oxidation step the resultant product was subjected to a pyrolyzing step step containing helium gas at 800° C. for a duration of 12 hours. At the end of the pyrolyzing step, the resultant product was very weak and soft indicating that a substantial portion of the hydrocarbons were not burned or driven off. Example 13, when compared to Examples 3 and 10, for example, illustrates the necessity of pyrolyzing the silicon material in an inert gas, such as helium, and then oxidizing the resultant product. If the oxidizing step is conducted first and the pyrolyzing step is conducted second, as was done in Example 13, the product is very weak and soft unlike the strong products obtained in Examples 3 and 10.

EXAMPLE 14

A silicon rubber tube of the dimensions set forth in Example 1 was pyrolyzed in a helium atmosphere at 540° C. to 570° C. for 2 hours. At the end of the pyrolyzation step, the product was oxidized in an atmosphere of air for 2 hours at 140° C. to 370° C. At the end of the oxidizing step, the product was re-pyrolyzed in a helium atmosphere at 800° C. for 10 hours. The resultant product was strong.

EXAMPLE 15

A silicon rubber tube of the dimensions set forth in Example 1 was pyrolyzed in a helium atmosphere at 570° C. for a duration of 2½ hours. After pyrolyzation, the sample was oxidized in air at 50 to 400° C. for 4 hours. After oxidizing, the sample was re-pyrolyzed in helium at 800° C. for 2 hours. The resulting product was very strong. Originally, the sample weighed 0.0045 grams. After the pyrolyzing step (step 1) the sample weighed 0.0020 gram. After the oxygenation step (step 2) the sample weighed 0.0023 gram indicating an increase in weight due to the crosslinking of the oxygen with the—SiO. After step 3, the sample weighed 0.0022 grams indicating that not all of the hydrocarbons were burned or driven off during the first pyrolyzation step.

EXAMPLE 16

A silicon rubber tube of the dimensions set forth in Example 1 was pyrolyzed in a helium atmosphere at 400° C. to 600° C. for 3 hours. An oxidation step was conducted on the resultant product in air at 580° C. for 12 hours. The resultant product after oxidation was strong. After oxidizing, the product was re-pyrolyzed in a helium atmosphere at 800° C. for 3 hours. The final product after re-pyrolyzation was brittle and solidified. It is theorized that some water vapor was present in the equipment which was washed just prior to the re-pyrolyzation step. It is believed that the water vapor caused the product to be brittle and to solidify. The silicon rubber tube initially weighed 0.0332 gram. After pyrolyzation, the membrane weighed 0.0170 gram. After oxidation, the sample weighed 0.0179 gram, thus indicating an increase in weight after oxidation which again illustrates the presence of oxygen during the crosslinking step.

EXAMPLE 17

A silicon rubber tube of the dimensions set forth in Example 1, was pyrolyzed in a nitrogen atmosphere at 580° C. for 3 hours. At the end of pyrolyzation, the product was oxidized in air at 450° C. to 650° C. for 14 hours. After oxidation, the product was re-pyrolyzed in nitrogen gas at 600° C. to 1000° C. for 4 hours. The resultant product was very strong. The original product weighed 0.0378 gram. After pyrolyzation, the product weighed 0.015 gram. After oxidation, the product weighed 0.0150 gram. The resultant product was subjected to permeability measurements for nitrogen, butane-2 and ethylene gases. The permeability tests were conducted by introducing a gas into the interior of the hollow silica membrane and measure the resultant gas flow through the tubular membrane. For nitrogen gas the permeability was approximately $1.38 \times 10^{-4}$ cc-m/m$^2$—cm Hg-sec. (these units are standard for permeability). For butane-2, the permeability was approximately $1.12 \times 10^{-4}$ (standard units). For ethylene, the permeability was $1.374 \times 10^{-4}$ (standard units).

EXAMPLE 18

A silicon rubber tube having an outside diameter of $\frac{3}{8}$ inch was prepared for pyrolysis in a nitrogen atmosphere at a temperature of 400° C. to 600° C. for 4 hours. After pyrolysis the product was oxidized in air at 600° C. for 12 hours. The resultant product was very weak.

EXAMPLE 19

A silicon rubber tube of the dimensions set forth in Example 1 was prepared for pyrolysis in a nitrogen atmosphere at 500° C. to 570° C. for 2 hours. After pyrolyzation, the resultant product was oxidized in air at 500° to 600° C. for 8 hours. After oxidizing, the product was re-pyrolyzed in nitrogen gas at 800° C. for 2½ hours. The resultant product was flexible, indicating that some hydrocarbons had not been burned or driven off. This product was prepared for permeability tests using nitrogen and ethylene gas. The nitrogen gas had a permeability of $1.44 \times 10^{-4}$ (standard units), while the ethylene gas had a permeability of $1.634 \times 10^{-4}$ (standard units). It is apparent when comparing the permeability measurements of Example 17 with Example 19 that the resultant product of Example 18 was less permeable which is reflected in the fact that the product appeared flexible.

Example 20

A silicon rubber tube of the dimensions set forth in Example 1 was pyrolyzed in a helium atmosphere at 800° C. for 6 hours. After pyrolyzation the resultant product was oxidized in air at 600° C. for 13 hours. The resultant product was very strong. Permeability tests were conducted on the product after the pyrolyzation step using nitrogen, butane-2, and on carbon monoxide and carbon dioxide after the resultant product had remained at room temperature for approximately 48 hours. The permeability for the nitrogen gas was about $0.64 \times 10^{-4}$ (standard units). The permeability for butane-2 was approximately $0.69 \times 10^{-4}$ (standard units). The permeability for carbon monoxide was about $0.69 \times 10^{-5}$ (standard units) while the permeability for carbon dioxide was approximately $0.594 \times 10^{-5}$ (standard units).

The permeability measurements for the product after the oxidation step were again conducted for nitrogen gas and butane-2 gas. The permeability for the nitrogen gas was about $0.83 \times 10^{-4}$ while the permeability for the butane-2 gas was approximately $0.96 \times 10^{-4}$. Again the sample was permitted to age at room temperature for 48 hours and then was tested with nitrogen gas, helium, hydrogen, argon, ammonia, carbon dioxide and carbon monoxide. The permeability for nitrogen was $0.582 \times 10^{-4}$. The permeability for helium was $1.548 \times 10^{-4}$. The permeability for hydrogen was $2.64 \times 10^{-4}$. The permeability for argon was $0.613 \times 10^{-4}$. The permeability for ammonia (NH3) was $0.721 \times 10^{-4}$. The permeability for carbon dioxide was about $0.5 \times 10^{-4}$; and the permeability for carbon monoxide was $0.712 \times 10^{-4}$. This example illustrates the fact that a mixture of hydrogen and nitrogen, for example, could easily be separated by employing the resultant products since hydrogen is approximately 5 times more permeable than nitrogen. Thus, a mixture of nitrogen and hydrogen gas could easily result in an enriched fraction of hydrogen or nitrogen.

EXAMPLE 21

A silicon rubber tube having a $\frac{3}{8}$ inch outer diameter was pyrolyzed in a nitrogen atmosphere at 400° C. for 7 hours. The resultant product was oxidized in air at 1000° C. for slightly less than 1 hour. The resultant product was very brittle.

EXAMPLE 22

A silicon rubber tube of the dimensions set forth in Example 1 was pyrolyzed in a helium atmosphere at 500° C. for 2 hours. The resultant product was oxidized in air at 400° C. for 2 hours. The resultant product was re-pyrolyzed in a helium atmosphere at 1000° C. for 3 hours. The resultant product was glassy in appearance.

EXAMPLE 23

A silicon rubber tube of the dimensions set forth in Example 1 was pyrolyzed in a nitrogen atmosphere at 570° C. for 3 hours. The resultant product was oxidized in air at 370° C. for 4 hours. The resultant product was glassy in appearance.

EXAMPLE 23

A silicon rubber tube of the dimensions set forth in Example 1 was pyrolyzed in a nitrogen atmosphere at 570° C for 3 hours. The resultant product was oxidized in air at 370° C. for 4 hours. The resultant product was re-pyrolyzed in a nitrogen atmosphere at 800° C. for 4 hours. The resultant product from step 3 (the re-pyrolyzation step) was a weak product.

The results of all the above examples are summarized in Table I, and the results of all permeability tests are set forth in Table II.

TABLE I

| | Summary of Pyrolysis Experiments | | | | |
|---|---|---|---|---|---|
| Sample No. | Step 1 | Step 2 | Step 3 | Weight | Remarks |
| 1 | Air 400° C. 6 hrs. | Air 470° C. 10 hrs. | | | After Step 1: solidified After Step 2: powdered |
| 2 | Air 200° C. 60 hrs. | | | | Elastic - incomplete burnoff |
| 3 | He 540° C. 4 hrs. | Air 370° C. 5 hrs. | He 840° C. 12 hrs. | Original wt: 0.022 gr. After Step 3: 0.0055 gr. | BET surface area: 220 m$^2$/gr Strong |
| 4 | He 750° C. 3 hrs. | — | — | — | Very weak |

TABLE I-continued

Summary of Pyrolysis Experiments

| Sample No. | Step 1 | Step 2 | Step 3 | Weight | Remarks |
|---|---|---|---|---|---|
| 5, 6 | He 230–800° C. 12 hrs | — | — | — | Very weak |
| 7, 8 | He 800° C. 12 hrs. | — | — | Original Wt: 0.0108 gr. After Step 1: 0.0041 gr. | Very weak |
| 9, 10 | He 450–520° C. 4.5 hrs. | (Sample 10) Air 450° C. 4 hrs. | He 800° C. 12.5 hrs. | Original: 0.0109 gr. After Step 3: 0.0044 gr. | Strong |
| 11, 12 | Air 430° C. 3.5 hrs. | — | — | | Powderized |
| 13 | Air 200–350° C. 1 hr. | He 800° C. 12 hrs. | — | — | Very weak, soft |
| 14 | He 540–570° C. 2 hrs. | Air 140–370° C. 2 hrs. | He 800° C. 10 hrs. | — | Strong |
| 15 | He 570° C. 2.5 hrs. | Air 50–400° C. 4 hrs. | He 800° C. 2 hrs. | Original: 0.0045 gr. After Step 1: 0.0020 gr. After Step 2: 0.0023 gr. After Step 2: 0.0022 gr. | Very strong |
| 16 | He 400–600° C. 3 hrs. (strong) | Air 580° C. 12 hrs. | He 800° C. Some 3 hrs. (Air or water vapor present) | Original: 0.0332 gr. After Step 1: 0.0170 gr. After Step 2: 0.0179 gr. | After Step 2: Strong After Step 3: Brittle & solidified |
| 17 | $N_2$ 580° C. 3 hrs. | Air 450–600° C. 14 hrs. | $N_2$ 600–1000° C. 4 hrs. | Original: 0.0378 gr. After Step 1: 0.0150 gr. After Step 2: 0.0150 gr. | Strong |
| 18 ⅜" OD tube | $N_2$ 400–600° C. 4 hrs | Air 600° C. 12 hrs | — | — | Very weak |
| 19 | $N_2$ 500–570° C. 2 hrs. | Air 500–600° C. 8 hrs. | $N_2$ 800° C. 2.5 hrs. | | Flexible |
| 20 (A,B) | He 800° C. 6 hrs. | Air 600° C. (20B) 12 hrs. | — | | Very strong |
| 21 ⅜" OD tube | $N_2$ 400° C. 7 hrs. | Air 1000° C. 1 hr. | — | | Very brittle |
| 22 | He 500° C. 2 hrs. | Air 400° C. 2 hrs. | He 1000° C. 3 hrs. | | Glassy |
| 23 | Ne 570° C. 3 hrs. | Air 370° C. 4 hrs. | $N_2$ 800° C. 4 hrs. | | Weak |

Notes:
(1) All tubes are 0.012" I.D., 0.035" OD silicon rubber tube (Dow Corning) except for Samples 21 and 24
*(2) Permeability measurements are made for Samples 17, 19 and 20 (See Table II)

TABLE II

Permeability Measurements

| Sample | Gas | Permeability (Q) Std. cc-cm/cm² cm Hg-sec. |
|---|---|---|
| 17 | $N_2$ | $1.19 \times 10^{-4}$ |
| | | $1.39 \times 10^{-4}$ |
| | | $1.38 \times 10^{-4}$ |
| | Butene-2 | $1.181 \times 10^{-4}$ |
| | | $1.298 \times 10^{-4}$ |
| | Ethylene | $1.374 \times 10^{-4}$ |
| 19 | $N_2$ | $1.44 \times 10^{-4}$ |
| | Ethylene | $1.634 \times 10^{-4}$ |
| 20A | $N_2$ | $0.623 \times 10^{-4}$ |
| | | $0.66 \times 10^{-4}$ |
| | Butene-2 | $0.611 \times 10^{-4}$ |
| | | $0.678 \times 10^{-4}$ |
| | (After 48 hrs. in room temperature) | |
| | CO | $0.693 \times 10^{-5}$ |
| | $CO_2$ | $0.594 \times 10^{-5}$ |
| 20B | butene-2 | $1.011 \times 10^{-4}$ |
| | | $0.865 \times 10^{-4}$ |
| | $N_2$ | $0.863 \times 10^{-4}$ |
| | | $0.804 \times 10^{-4}$ |
| | (After 48 hrs. in room temperature) | |
| | $N_2$ | $0.582 \times 10^{-4}$ |
| | He | $1.548 \times 10^{-4}$ |
| | $H_2$ | $2.64 \times 10^{-4}$ |
| | Ar | $0.613 \times 10^{-4}$ |
| | $Nh_3$ | $0.921 \times 10^{-4}$ |
| | $CO_2$ | $0.45 \times 10^{-4}$ |
| | | $0.695 \times 10^{-4}$ |
| | CO | $0.712 \times 10^{-4}$ |

What we claim is:

1. A method of forming a membrane capable of withstanding high temperatures for separating gases comprising the steps of:
   (1) pyrolyzing a silicon-based material having hydrocarbons and SiO chains in its structure to drive off substantially all hydrocarbons, said pyrolyzed silicon-based material consisting essentially of loosely connected SiO chains, said pyrolyzing being conducted at a temperature range of from about 500° C. to about 1000° C., for a minimum duration of about 2 hours, in an inert gaseous atmosphere under positive pressure; and
   (2) oxidizing said pyrolyzed silicon-based material in an oxidizing atmosphere to crosslink said SiO radicals to form silica, said oxidizing being conducted at a temperature from about 300° C. to about 1000° C., for a minimum duration of about 2 hours, thereby forming a porous membrane capable of withstanding high temperatures.

2. The method of claim 1, including the step of re-pyrolyzing said oxidized silica membrane in an inert gaseous atmosphere at a temperature range from about 500° C. to about 1000° C., for a minimum duration of about 2 hours.

3. The method of claim 2, wherein said re-pyrolyzed silica material is coated with a second silicon material to fill in the micropores, and further re-pyrolyzed in an inert gaseous atmosphere at a temperature range of from 500° C. to about 1000° C. for a minimum duration of about 2 hours.

4. The method of claim 1, wherein said pyrolyzed silica material is coated with a second silicon material to fill in the micropores, and re-pyrolyzed in an inert gaseous atmosphere at a temperature range of from 500° C. to about 1000° C. for a minimum duration of about 2 hours.

5. The method of claim 1, wherein said silicon-based material is one of polysilicone rubber, and polysiloxanes.

6. The method of claim 1, wherein said inert gaseous atmosphere is anyone of the class consisting of nitrogen, carbon dioxide, helium, argon, neon, and mixtures thereof.

7. The method of claim 1, wherein the pyrolyzation temperatures is about 850° C. and the duration of pyrolysis is about 4 hours.

8. The method of claim 1, wherein said silicon-based material is tubular in shape.

9. The method of claim 1, wherein said oxidizing atmosphere is air.

10. The method of claim 1, wherein the oxidizing atmosphere is oxygen.

11. The method of claim 1, wherein the said silica membrane has a porosity of about 40% to about 70%.

12. The method of claim 1, wherein the silica membrane has a B.E.T. surface-area measurement of 200 $m^2/g$.

13. The method of claim 1, wherein said pyrolyzed silicon-based material does not shrink more than 10% in size during pyrolysis.

14. The method of claim 4, wherein said second silicon material contains silicone oil and a vulcanizing agent.

15. The method of claim 14, wherein said vulcanizing agent is an organic peroxide, zinc, or platinum.

16. The method of claim 15, wherein said vulcanizing agent is about 1% by weight of the total composition of said silicone oil and said vulcanizing agent.

* * * * *